Nov. 11, 1930.                     C. T. LYONS                       1,781,403
                                  SHIP'S FENDER
                        Filed July 23, 1929        2 Sheets-Sheet 1
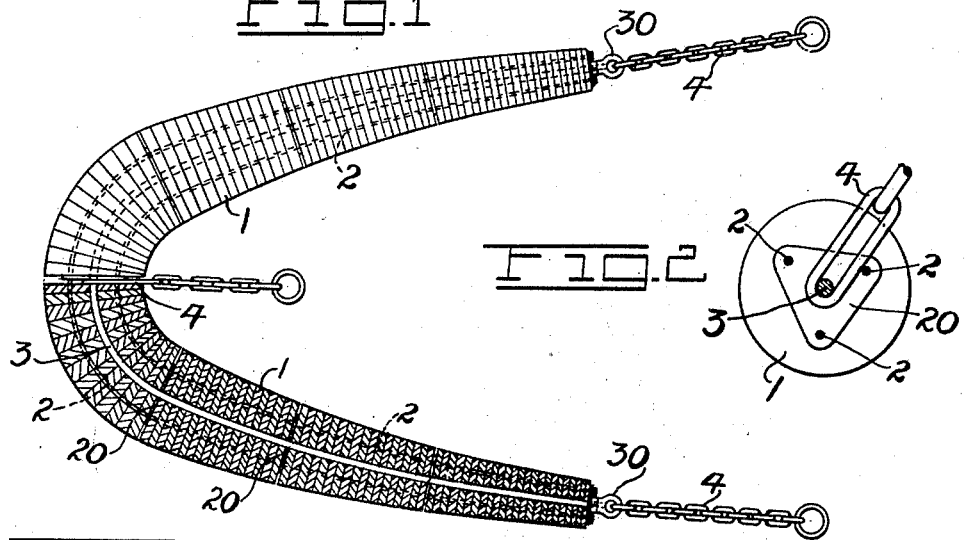
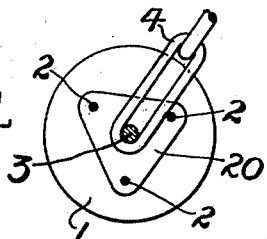
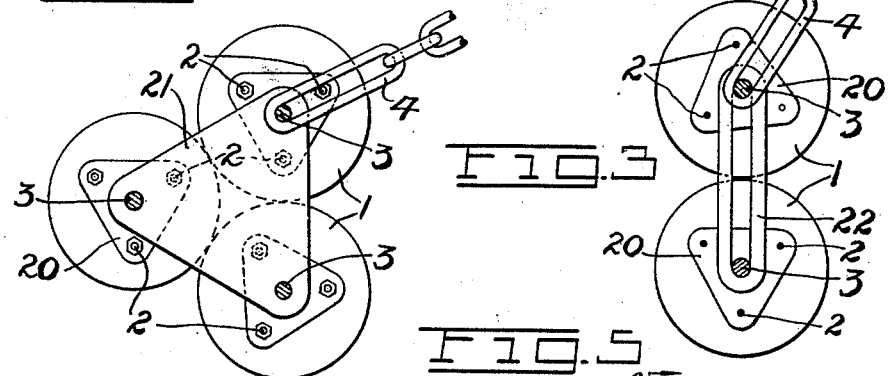
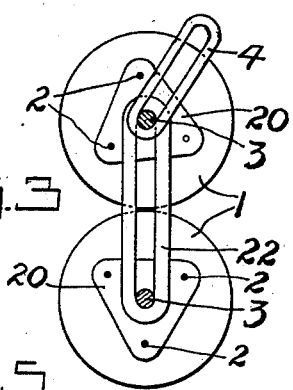
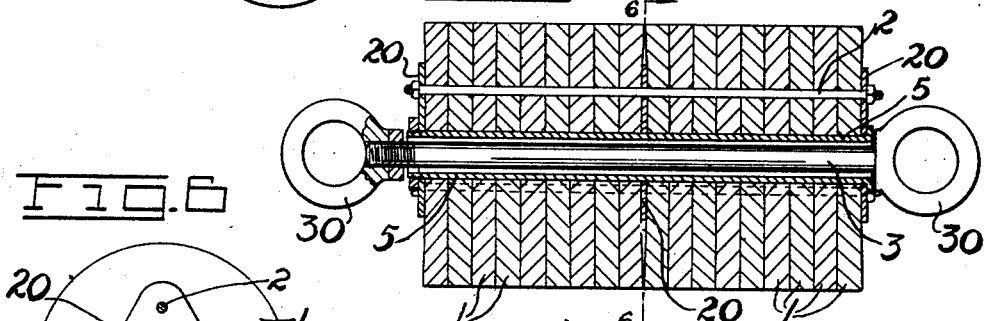
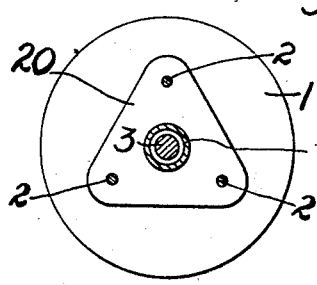
Inventor
*Charles T. Lyons*
By *Reynolds & Reynolds*
Attorneys

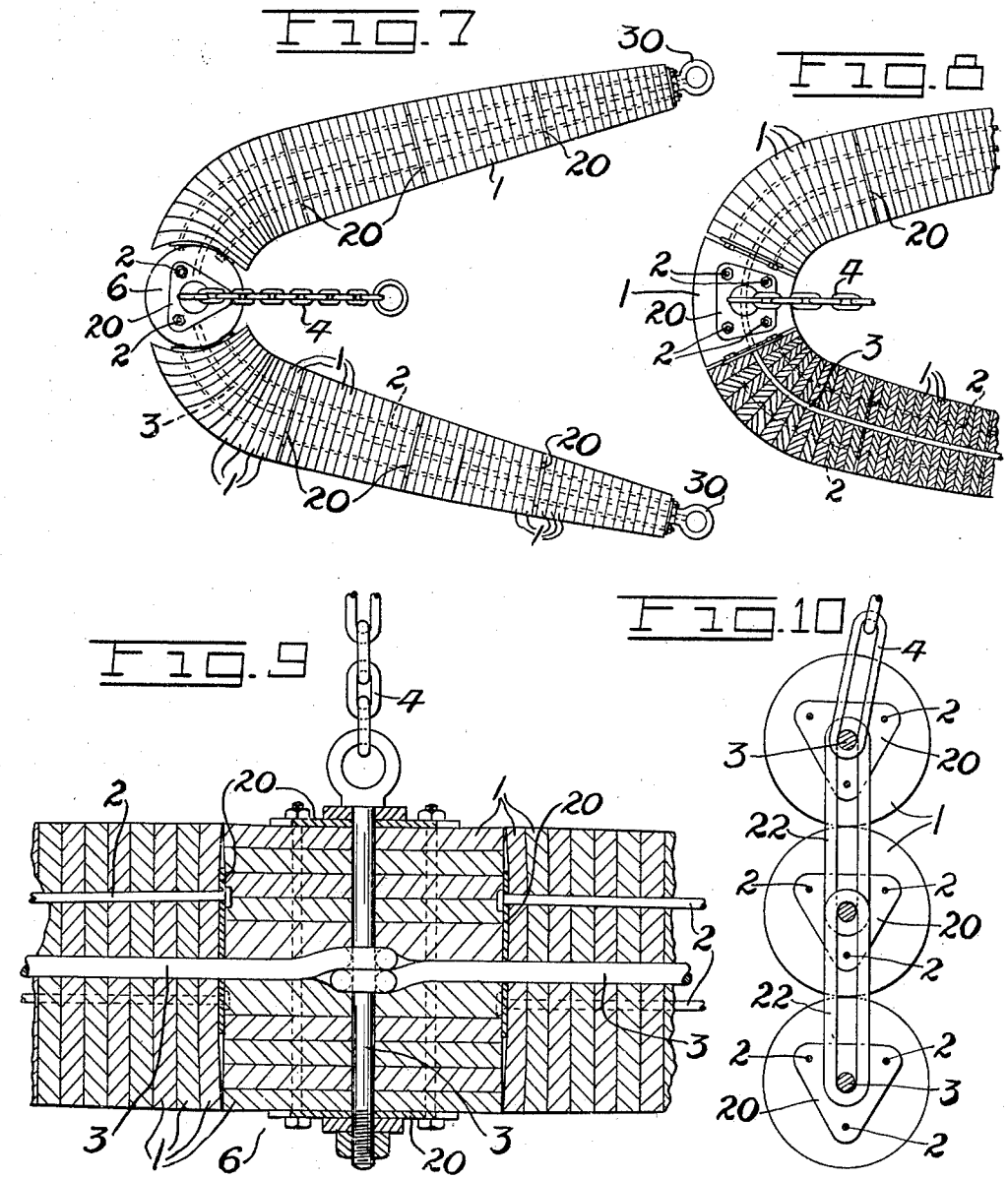

Patented Nov. 11, 1930

1,781,403

UNITED STATES PATENT OFFICE

CHARLES T. LYONS, OF MEDINA, WASHINGTON, ASSIGNOR TO DURABLE MAT COMPANY, OF SEATTLE, WASHINGTON, A CORPORATION OF WASHINGTON

SHIP'S FENDER

Application filed July 23, 1929. Serial No. 380,280.

My invention relates to ships' fenders and consists of a fender of which the chief feature is a body built up by assembling disk-like elements of a resilient material in face-to-face relation.

The material chiefly contemplated for the disks is automobile tires, although disks of other suitable composition may be used.

The object of my invention is the production of fenders having a high efficiency and durability providing more resiliency and shock absorbing features than rope.

In the accompanying drawings I have shown fenders made in accordance with my invention, these varying somewhat in their assembled shapes.

Figure 1 shows a simple form of bow fender.

Figure 2 is a cross-section of the fender of Figure 1 taken at the point of attachment of a supporting chain thereto.

Figures 3 and 4 are similar sections of fenders in which a plurality of the simple fenders shown in Figures 1 and 2 are assembled to make a compound fender.

Figure 5 is a longitudinal section and Figure 6 a section on the line 6—6 showing a side fender.

Figures 7 and 8 are top views of bow fenders having a modified construction.

Figure 9 is a longitudinal section of a short central section of the fender of Figure 7.

Figure 10 illustrates the assembling of a plurality of fender units in vertically disposed relation.

The chief feature of my invention is the use of disks or plates assembled in face-to-face relation, which plates have a resiliency adapting them to use as fenders. My invention also includes certain other features of construction which will be hereinafter pointed out.

The material which I contemplate chiefly using, is automobile tires. I however intend to use disks and other parts especially made to fill specific needs, as may be demanded. Disks of this sort may be obtained in sizes up to twenty-four inches diameter. The size of disks used will vary with the type and size of fender desired. Their shape may be round, oval, elliptical, square, or oblong, or in fact any shape desired may be used, their utility arising from the fact that they are individually resilient, but mutually sustaining when held on a core and supported at either side by adjacent disks.

Such disks vary somewhat in thickness at different points. They may be cut in such a way and size as to be thickest on one edge and thinnest on the opposite edge. Such variations in thickness may be combined in the assembled fender unit as to neutralize the differences of thickness, or may be utilized to produce a fender of curved or bent shape.

The disk elements as 1, employed are provided with holes adapted for the reception of a binding rod or rods, 2, or an equivalent member which clamps and holds the disks of a unit closed in face to face relationship. At the end of each fender element, and also wherever desired at intermediate points, plates 20 of metal or other suitable material are inserted, through which the binding rods pass. I would contemplate usually employing three such binder rods, chains or the like, in each fender unit. These rods would be of relatively small size so that the fender may be bent as necessary to fit upon the boat. This bending may be done either before or after application to the boat. In most cases the rods will be bent before assembling the disks thereon.

A bow fender, such as shown in Figures 1, 7 and 8, if of any size, would be composed of several such fender units. For this purpose the disks are provided with a central hole for the passage of a rod, chain, cable or equivalent core member 3. This is provided at each end of the fender, with an eye 30 or other means whereby lines may be attached thereto for handling and supporting the fender.

A bow fender would additionally be provided at its apex with a supporting chain, as 4, connected with the central rods or chains 3. Such supporting chains may be additionally provided as desired.

A simple form of bow fender would employ a single such construction, as has been indicated in Figure 2. I may however employ a plurality of such assembled constructions, as is indicated in Figures 3 and 4. Where piled up as indicated in Figure 4, plates as 21 are employed to retain the parts in proper relation. Where assembled as in Figure 3, links or bars 22 connect the rods 3.

The fender shown in Figure 5 is a roller or side fender. This has a tube 5 surrounding the rod 3 and sufficiently larger to permit free turning of the fender upon the rod. The rod 3 has an eye 30 at each end to which suspending lines may be attached. The tube 5 may have its ends flanged or provided with a nut to secure it in place. This fender is designed to be supported against the side of a ship with its axis horizontal so that it may roll and turn freely without twisting its suspending lines when placed between two ships or between a ship and dock.

Figures 7, 8 and 9 illustrate a modified construction for a bow fender in which the two side wings are separate and are each connected with a central section 6, upon which the disks are placed in horizontal planes and their axis is vertical. In this construction certain of the disks 1 at each side of the central section 6 may advantageously be made and placed with a thickened edge outwardly. The natural difference in thickness between tread and flank portions of a tire may be sufficient for part of these, but specially molded disks may be used for others. The central cylindrical section 6 may or may not have the central tube as shown in Figure 5. The rods 3 of the side wings are connected direct with the rod 3 of the central section, to plates such as 20, links 22, or in any other suitable manner.

In Figure 7 the central section 6 is made of circular disks. In Figure 8 this section is shown as made from disks of the outline of a truncated cone. Other shapes may be used.

Fenders made of the material herein proposed have been found to have better non-slipping and gripping qualities than any other fender in use and to also last very much longer.

What I claim as my invention is:

1. A boat fender composed of disks cut from rubber tires, clamping rods passing through a series of disks to form a fender section and a holding member passing through a series of said sections to form a fender.

2. A boat fender composed of sections each comprising a series of disks of a resilient material assembled in face-to-face relation, a plurality of binding elements passing through said disks at points outwardly of a central axis, and an assembling member passing centrally through said sections.

3. A boat's fender composed of a plurality of elements each comprising disks of a resilient material and an assembling core passing through all of the disks, and a series of plates through each of which said assembling core passes to thereby form a compound fender.

4. A fender comprising base and superposed sections each composed of disks strung upon an assembling core and plates transversely connecting said sections at intervals to form base and superposed sections.

Signed at Seattle, Washington, this 17th day of July, 1929.

CHARLES T. LYONS.